US006709350B1

(12) United States Patent
Onstad

(10) Patent No.: US 6,709,350 B1
(45) Date of Patent: Mar. 23, 2004

(54) TEMPLATE ASSEMBLY AND METHOD FOR MARKING FIELD LINES ON A FOOTBALL PLAYING SURFACE

(76) Inventor: Jay Russell Onstad, 9575 Juniper St., NW., Coon Rapids, MN (US) 55433

( * ) Notice: Subject to any disclaimer, the term of this patent is extended or adjusted under 35 U.S.C. 154(b) by 33 days.

(21) Appl. No.: 10/230,450

(22) Filed: Aug. 29, 2002

(51) Int. Cl.[7] .......................... A63B 67/00; A63B 69/00; G01B 3/14

(52) U.S. Cl. .......................... 473/415; 473/440; 33/1 G; 33/562

(58) Field of Search ................................ 473/415, 422, 473/440, 438, 490, 470, 173, 176; 273/392, 400; 116/222, 201, 209; 33/1 G, 756, 759, 563, 712, 562

(56) References Cited

U.S. PATENT DOCUMENTS 1,645,707 A * 10/1927 Lipp .......................... 33/759
1,684,566 A * 9/1928 Winkler ....................... 33/759
1,982,304 A * 11/1934 Holden ........................ 33/756
3,039,197 A * 6/1962 Abbott ........................ 33/456
3,368,504 A 2/1968 Cohen
3,580,573 A * 5/1971 Noonan et al. ............. 473/470
3,634,961 A * 1/1972 Nawalaniec ................. 40/598
3,678,592 A * 7/1972 Williamson .................. 33/289
3,741,662 A * 6/1973 Pioch ......................... 356/399
3,768,435 A * 10/1973 Dicker ....................... 116/200
3,834,033 A * 9/1974 Pinkard ....................... 33/563
3,837,317 A * 9/1974 Hanauer ..................... 116/311
4,090,708 A * 5/1978 McPeak ....................... 33/289
4,274,459 A * 6/1981 Galajda ................. 144/144.51
4,468,862 A * 9/1984 Barnhill ....................... 33/563
4,937,949 A 7/1990 Kiefer
5,113,589 A * 5/1992 Randolph ................... 33/289
5,280,921 A 1/1994 Milburn
5,357,872 A 10/1994 Wilmore
5,519,940 A * 5/1996 Brondfield ................... 33/1 G
5,706,586 A * 1/1998 Payne ......................... 33/563
6,012,228 A * 1/2000 Fisanich ...................... 33/289
6,058,853 A 5/2000 Pinch

* cited by examiner

*Primary Examiner*—Gregory Vidovich
*Assistant Examiner*—Mitra Aryanpour
(74) *Attorney, Agent, or Firm*—Michael A. Mochinski

(57) ABSTRACT

A template assembly comprising at least one marking template comprising a pair of side rails and a pair of end rails integrally connected at their ends to substantially form a rectangular-configured frame; and a plurality of marking pans situated within and fixedly attached to the rectangular-configured frame, each having a bottom facing plate and an upwardly extending wall along the perimeter thereof to substantially form a receptacle for holding and collecting marking media used in establishing the field line, the bottom facing plate comprising a rectangular-shaped opening having geometric dimensions substantially equivalent to the width and length of a field line typically appearing on a football playing surface.

20 Claims, 10 Drawing Sheets

TEMPLATE ASSEMBLY AND METHOD FOR MARKING FIELD LINES ON A FOOTBALL PLAYING SURFACE

FIELD OF THE INVENTION

The present invention relates in general to a template assembly and method for marking field lines on a football playing surface and the like. More specifically, the present invention provides means to efficiently and accurately create and construct field lines of the type commonly appearing on a football playing surface, in addition to possessing features for compact handling and storage during nonuse thereof.

BACKGROUND OF THE INVENTION

Many field sports like football and soccer are played on a playing surface comprised of either natural or artificial turf. As in most instances, a professional as well as a college level athlete will be provided an opportunity to play on an artificial surface, while a high school player or a little leaguer will find himself or herself playing on a natural surface such a grass. Although great strides have been made regarding the playing surface insofar of providing a more playable surface for the athlete, little or no efforts have been made concerning the efficiency in which to mark or place field lines and the like on a playing surface, particularly of the type used in the sport of football. Regardless of the playing surface, whether it is artificial or natural, the marking of field lines is typically performed using some sort of marking template. In some cases, the template may comprise simply of a sheet of plywood having a series of apertures extending therethrough, generally resembling the geometric configuration of the lines to be marked on the playing surface. In other, but more advanced cases, a machine capable of spot marking the field line may be employed and will generally comprise of rather complicated means to guide the machine for accurate placement of the field lines on the playing surface. However, as with most marking machines of this nature, they can be expensive to maintain and operate and cumbersome to maneuver about the field; and, therefore, their application on the field may be limited to those institutions having ample budgets. Given this limitation, a marking template as hereinbefore described is preferably utilized over a field line marking machine due to its predominate features of being affordable, portable for transport, simple to use, and reasonably compact for storage during nonuse, particularly during the off season. In a typical scenario of using a marking template, one set of field lines will be created using the template, with subsequent field lines being created by situating one of the apertures over a freshly marked line and one of the edges of the template abutting a known reference point, both serving as effective means to guide and align the same for accurate placement of the next set of field lines. This process continues up and down the entire length of the playing field for at least four rounds, with a series of field lines being situated along the entire length of the two sidelines and an equal number substantially placed in the middle of the field, generally referred to as the inbound lines. As one can imagine, this can be a tedious process and if there is little to no attention to detail by the grounds crew, the playing surface may comprise simply of inaccurate placed field lines, which cannot be easily and readily altered or replaced due to the permanency of most marking media. Another drawback of using a plywood template is that it can be rather cumbersome to use and store due to its weight and size, respectively. In addition to some of the known shortcomings of marking templates presently known in the art, some marking templates may be prone more than others in creating a field line bearing an offset shadow or distorted image, which generally occurs if using a template having ample thickness on an elevated grass surface and in other cases where moderately windy conditions persist during the marking of field lines.

In accordance with the present invention, applicant has appreciably devised a template assembly and method for accurate placement of field lines on a playing surface, particularly of the type used on a football playing surface, with no substantial appearance of the marked field line being unduly shadowed or distorted. Furthermore, the template assembly is readily made compact for long- and short-term storage and easily transported as a result of being inherently constructed of light-weighted materials.

BRIEF SUMMARY OF THE INVENTION

In order to overcome the numerous drawbacks apparent in the prior art, a template assembly has been devised for use in creating and placing field lines on a playing surface, particularly of the type commonly used in the game of football.

It is thus an object of the present invention to provide a low cost, non-complicated template assembly which may be reliably used to accurately establish hash lines of the type commonly appearing on a football playing field, specifically along and near the sidelines and substantially at midfield of the playing surface, generally known in the art as inbound lines.

It is another object of the present invention to provide such a template assembly which affords versatility in terms of functioning in varied climatic, windy conditions.

It is yet another object of the present invention to provide such a template assembly which is capable of being securely fastened to the playing surface to eliminate the occurrence of inadvertent movement thereof for more accurate placement of field lines about the playing surface.

It is another object of the present invention to provide such a template assembly which possesses the capacity to substantially eliminate the occurrence and appearance of a shadowed or distorted field line.

It is yet another object of the present invention to provide such a template assembly which accomplishes the foregoing and other objects and advantages and which is economical, durable, and fully effective in performing its intended functions.

In accordance with the present invention, a template assembly has been devised for use in creating and spatially establishing field lines on a playing surface, particularly hash lines at the sidelines and substantially at midfield of a football playing surface, the template assembly comprising in combination at least one marking template comprising a pair of side rails and a pair of end rails integrally connected at their ends to substantially form a rectangular-configured frame; and a plurality of marking pans situated within and fixedly attached to the rectangular-configured frame, each having a bottom facing plate and an upwardly extending wall along the perimeter thereof to substantially form a receptacle for holding and collecting marking media used in establishing the field line, the facing plate comprising a rectangular-shaped opening substantially equivalent to the width and length of a field line typically appearing on a football playing surface.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as a device for creating and establishing field lines of the type commonly utilized on a football playing surface, generally known in the art as hash lines, each principally serving as a predetermined reference point for placing a game ball about the field as participants engage in the sport of football.

Figure 1:
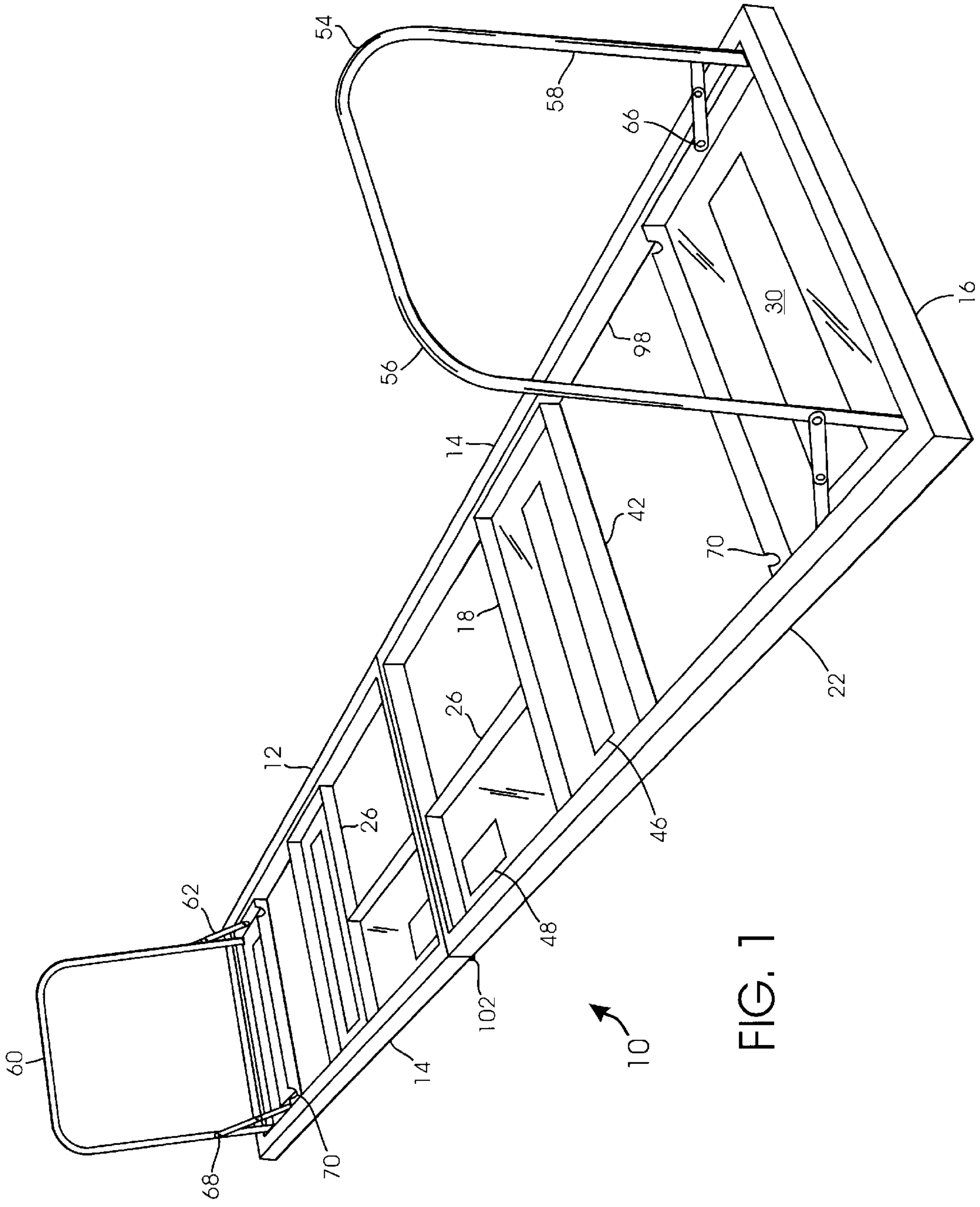
FIG. 1 is a perspective view of the preferred embodiment of the present invention.
Figure 2:
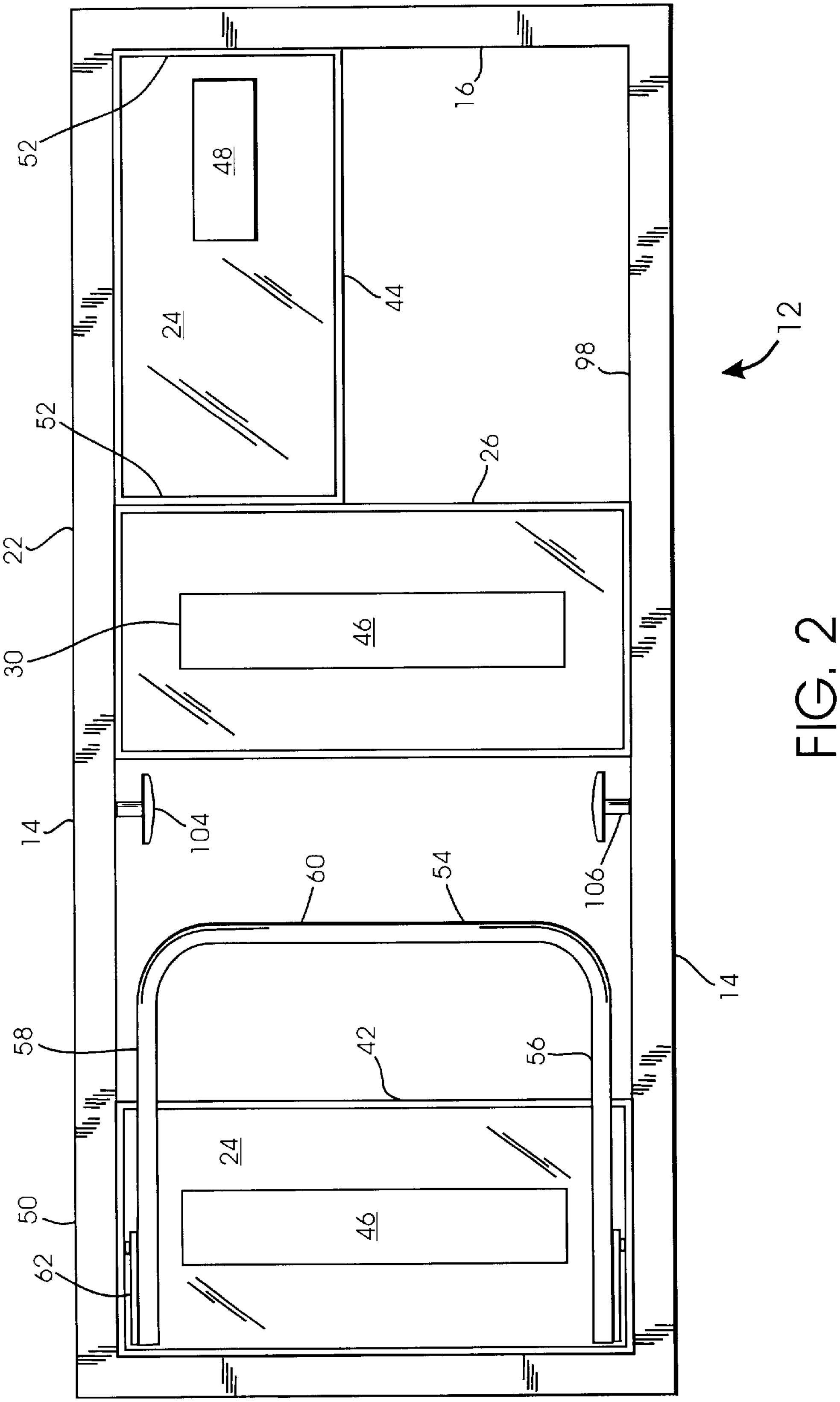
FIG. 2 is a top view of the preferred embodiment of the present invention illustrating one marking template.

Referring to FIG. 1, there is shown generally at 10 a template assembly comprising at least one marking template 12 having a pair of side rails 14 and a pair of end rails 16 and a plurality of marking pans 18 configurably arranged to establish field lines of requisite form on a football playing surface 20. In the preferred embodiment, each side rail 14 is configurably parallel and substantially symmetrical to one another in terms of shape and form and is integrally connected to and separated apart from one another a predetermined distance by the pair of end rails 16, each of which being positioned perpendicular to the side rails. Each end rail is geometrically similar to the side rails in terms of having an equivalent cross section and profile, but is generally shorter in size to accommodate the requisite placement and spatial separation of each field line. In final assembled form, the side and end rails will substantially form a rectangular-configured frame 22, with such configuration generally establishing the perimeter and outer extremities of the marking template 12, as best depicted in FIG. 2, and will preferably comprise a comprehensive width of approximately 2.5 feet and a length of approximately 7 feet. The side rails 14 as well as the end rails 16 are preferably made from a light-weighted material such as aluminum so as to provide greater ease in maneuvering the template assembly about the playing field 20 insofar to assist in achieving accurate placement of the field lines. Although other materials may be suitable for this application, aluminum has been found to appreciably possess moderate rigidity for sustained, reliable use and is less susceptible to corrosion, particularly in instances where the template assembly 10 is used in moist climatic conditions.

Figure 3:
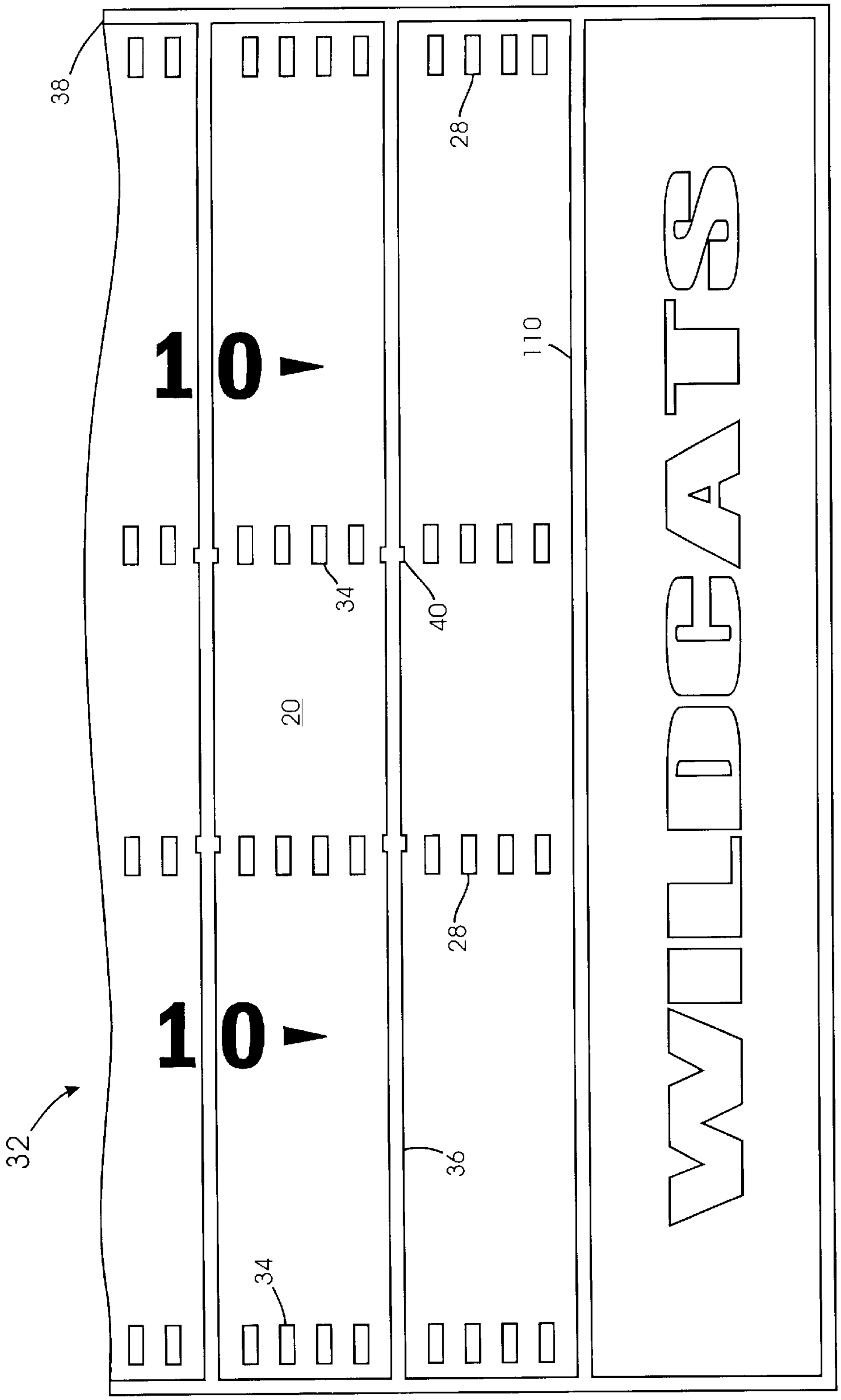
FIG. 3 is a top partial view of a typical football playing surface comprising sideline and inbound field lines.

As depicted in FIG. 2, each marking pan 18 comprises a bottom facing plate 24 and an upwardly extending wall 26 emanating therefrom, specifically along the perimeter thereof. The upwardly extending wall comprises a height substantially equivalent to the thickness of the side and end rails and is positioned perpendicular to the bottom facing plate 24. The height of the upwardly extending wall effectively serves as means to amply collect built-up marking media insofar to prevent undue spillage from the marking template during use and to mitigate the impact of wind as marking media is applied to the marking template to create a field line 28 having little to no shadow- or distorted-like appearance. The upwardly extending wall positioned along the perimeter of the bottom facing plate additionally serve as a location to fixedly attach each of the marking pans to the side and end rails 14, 16 so as to further enhance the overall structural integrity of the template assembly 10 during use and handling thereof. Each bottom facing plate 24 further comprises a rectangular-shaped opening 30 having a predetermined length and width, preferably corresponding to the known geometric configuration of the field line 28. As FIG. 3 partially illustrates, a standardized football field 32 will consist of a series of field lines known in the art as hash lines 34, which are strategically placed parallel with respect to one another and in reference to the football field's established yard lines 36, which are located five yards apart on center. Typically a hash line 34 will comprise a width of approximately 4 inches and length of approximately 24 inches, which tends to be the standard size used at most playing levels. These hash lines are appropriately placed near and along the sidelines 38 and substantially near the middle of the playing surface 20 to principally form and establish a predetermined number of inbound lines 40 used in the game of football. Accordingly, each marking template 12 will preferably comprise of at least three marking pans 18, two of which are used to create a pair of hash lines of approximately one yard apart on center, hereinafter referred to as hash line marking pans 42, and another to create an inbound line 40 that extends perpendicular thereto and in parallel arrangement with the sidelines 38, hereinafter referred to as an inbound line marking pan 44.

Referring now to FIG. 2, each of the two hash line marking pans 42 comprises a rectangular-shaped hash line opening 46, preferably larger than that used in the inbound line marking pan 44, with the opening having an equivalent width and length of the hash line, as described hereinbefore. Although the inbound line marking pan will also comprise a rectangular-shaped opening, referred hereinafter as a rectangular-shaped inbound line opening 48, its width will preferably correspond to the width of the hash line but will comprise a shorter length of approximately 10 inches. The arrangement of the two hash line marking pans within the structure created by the pair of side and end rails 14, 16 will be such to allow the hash lines to exist one yard apart on center, in a parallel configuration, as best seen in FIG. 2. In a preferred configuration, one hash line marking pan 42 is attached longitudinally to one of the two end rails 16, with the two shorter ends thereof being configurably attached to an end portion 50 of each of the two side rails 14. The second hash line marking pan is positioned parallel to the first hash line marking pan and is located approximately one yard on center from the rectangular-shaped hash line opening of the first hash line marking pan. In a similar manner as the first, the second hash line marking pan is fixedly attached at its ends to the pair of side rails 14, as shown in FIG. 2. The inbound line marking pan 44, similar to the first and second hash line marking pans 42, is attached to the side and end rails, but is positioned perpendicular to the pair of hash line marking pans and comprises a pair of ends 52, one of which being fixedly attached to the end rail 16 and the second end being fixedly attached to a portion of the upwardly extending wall of the second hash line marking pan 42. The inbound line marking pan is also fixedly attached lengthwise along the side rail 14 to sufficiently enhance the structural integrity of the marking template 12 without unduly compromising the overall weight thereof.

Figure 4:
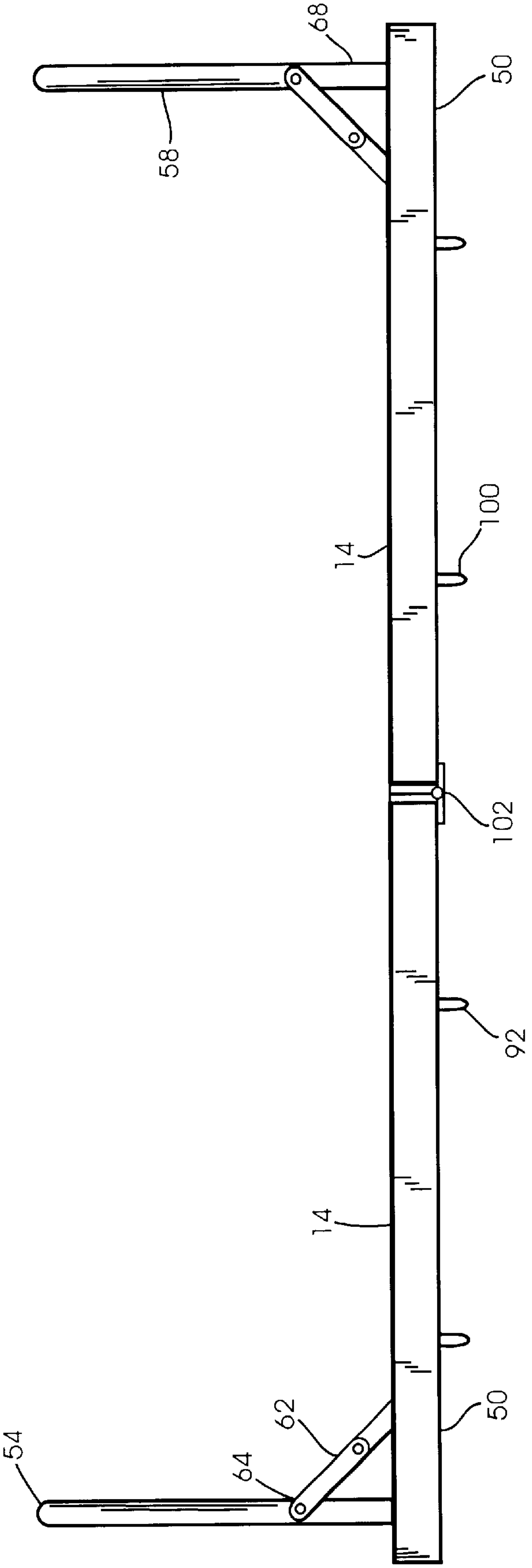
FIG. 4 is a side elevational view of the preferred embodiment of the present invention illustrating a pair of marking templates pivotally connected to one another by a piano hinge.

Each marking template, as shown in FIG. 2, further comprises a handle assembly 54 for enhanced maneuverability of the template assembly 10 as it is placed about the playing field to create the requisite number and spatial separation of the field lines 28. The handle assembly generally comprises an elongate tubular member 56 substantially configured to form a pair of vertical supports 58 and a horizontal member 60 extending therebetween in perpendicular relation thereto and having a length shorter than the end rail 16. The handle assembly 54 further comprises a pair of collapsible support brackets 62 each having two ends 64, 66, one of which is pivotally connected to the side rails 14 and a second end 66 being pivotally connected to a lower portion 68 of each of the vertical supports 58. As illustrated in FIGS. 1 and 4, upon final positioning of the handle assembly in a fully upright orientation, each of the collapsible support brackets 62 will be fully extended diagonally to substantially position the lower portion 68 of each of the vertical supports near the end rail 16. This arrangement correspondingly locks the handle assembly in an upright, easy accessible position for increased, reliable handling of the template assembly 10 during use thereof. In order to permit compact storage of the template assembly, each handle assembly 54 is configured to pivotally move inward as hand pressure is applied to the upper extremities of the handle assembly, specifically at the location of the horizontal member 60. As this movement continues to a fully collapsed state, each bracket will correspondingly move inward and will finally rest alongside the lower portion 68 of the vertical support. Because the upwardly extending wall 26 of one of the hash line marking pans 42 effectively interferes with complete compactness of the handle assembly within the rectangular-configured frame 22 upon closure, a pair of notches 70 is formed in the upwardly extending wall furthermost from and parallel to the end rail 16, as shown in FIG. 1. Each notch 70 is substantially located where the vertical support would engage the upwardly extending wall upon being inwardly positioned and comprises a depth and width of approximately one and one-half the diameter of the vertical support so as permit unhindered movement as the vertical support is positioned therein for storage and removed therefrom for use. In an alternative embodiment, as partially illustrated in FIG. 5, the handle assembly 54 may simply comprise a flexible member 72 of continuous type such as a chain or cable having ends 74 fixedly attached to a portion of the side rails 14 to further enhance compactness and storage of the template assembly 10 and overall weight for more effective positioning about the playing surface 20.

Figure 6:
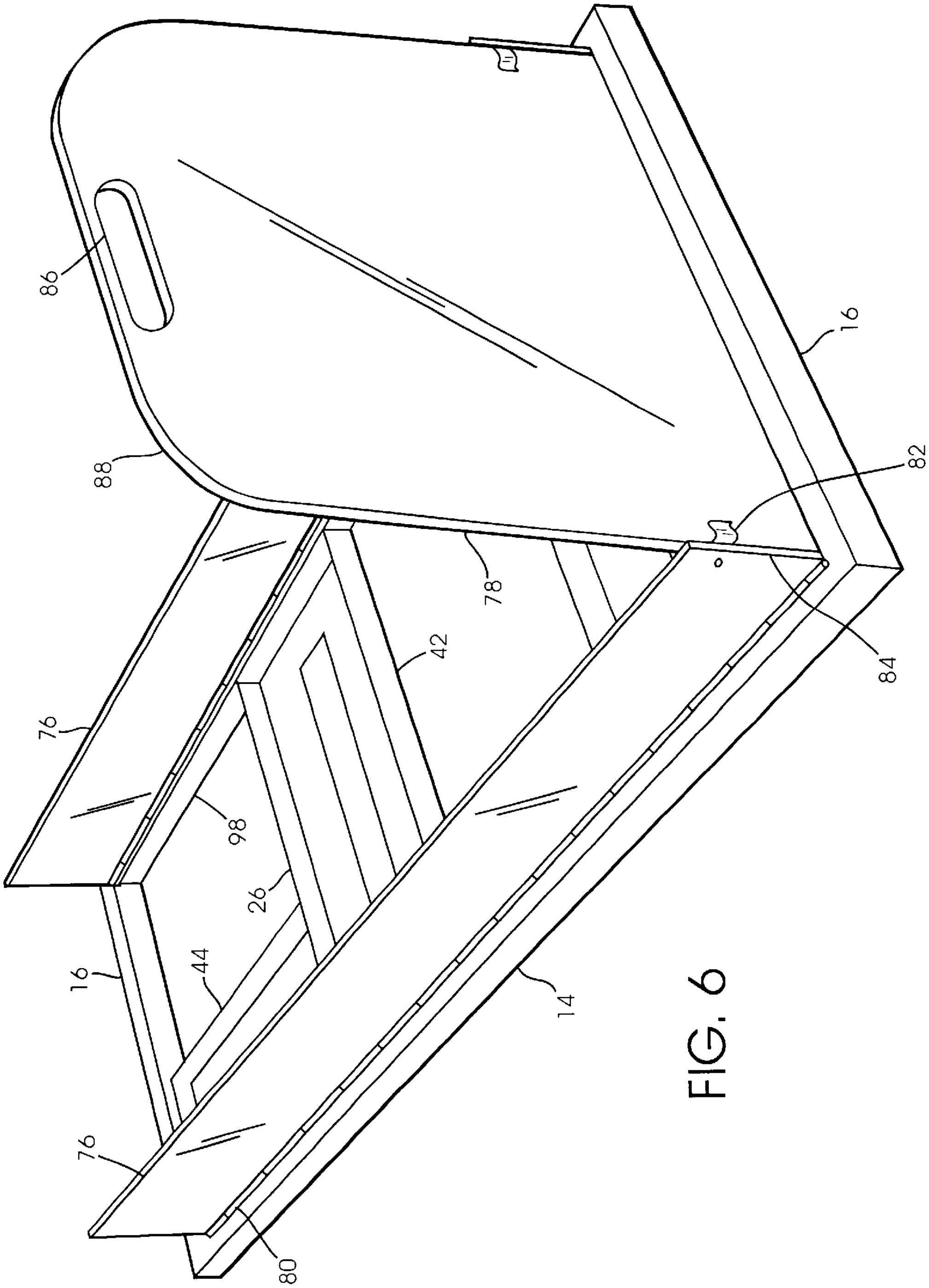
FIG. 6 is a perspective view of an alternative embodiment of the present invention illustrating attachment of windblock walls to a pair of side rails.
Figure 7:
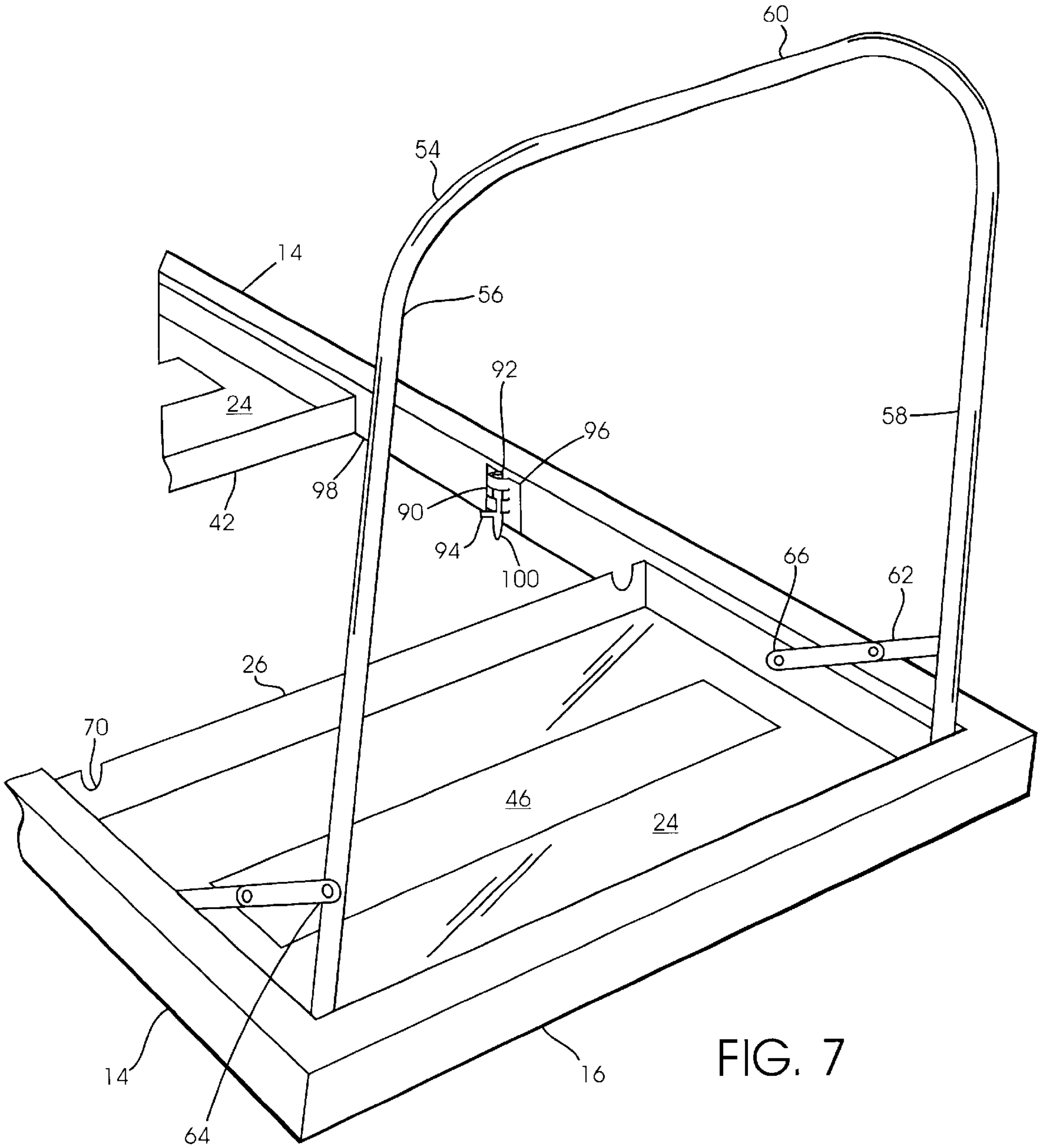
FIG. 7 is a partial perspective view of the preferred embodiment of the present invention illustrating attachment of a stabilizing assembly to a side rail.

Referring now to FIG. 6, in order to facilitate blockage of wind and/or inclement conditions for improved marking of field lines, the marking template 12 may comprise a pair of windblock walls 76 and an end panel 78 substantially serving in part as a handle. Preferably, each windblock wall 76 comprises a minimal height of approximately 10 inches to permit access to and movement within the marking template for close positioning of marking media at the hash line and inbound line marking pans 42, 44 and is pivotally mounted lengthwise along the side rail 14 using a piano hinge 80 of similar length insofar to allow inward positioning of the windblock wall 76 within the rectangular-configured frame 22 for storage. Each windblock wall further comprises a retention clip 82 fixedly mounted near an end 84 of the windblock wall, most near the handle assembly, insofar to engage a lower portion 68 of either the vertical support 58 or end panel 78. Each retention clip principally serves to lock and support the windblock wall in an upright position during use of the marking template 12, as shown in FIG. 6. In order to facilitate repositioning of the marking template about the playing surface 20 for creation of field lines, the end panel 78 comprises an elongate cutout 86 near an upper portion 88 thereof to serve as means for positioning a person's hands therewithin. Mounting the end panel to the marking template 12 comprises usage of the collapsible support brackets 62, primarily those used for the handle assembly 54 comprising the pair of vertical supports 58 and horizontal member 60. Given the presence of windblock walls and the opportunity for wind to inadvertently move the marking template during use, each side rail is preferably equipped with at least one stabilizing assembly 90 possessing the capacity to temporarily anchor the marking template to the playing surface 20. As illustrated in FIG. 7, the stabilizing assembly preferably comprises an elongate spike 92 having an outwardly extending arm 94 for ready retrieval and positioning within a locking receptacle 96 that is fixedly attached to an inner wall 98 of the side rail 14. Given the firmness of most playing surfaces, the elongate spike further comprises a pointed end 100 insofar to ease penetration into the playing surface, as depicted in FIGS. 4 and 7. Although the stabilizing assembly 90 is most appropriately used where the playing surface is penetrable, such as a grass field, it may be utilized in a limited manner on an artificial playing surface by limiting the extent to which the elongate spike 92 is downwardly positioned below and beyond the side rail. Should it be desirable in all respects not to use the stabilizing assembly, particularly in the instance of storing the marking template 12, the elongate spike can be entirely retracted within the locking receptacle 96 with the pointed end 100 being positioned within the dimensional confines of the side rail 14.

Figure 8:
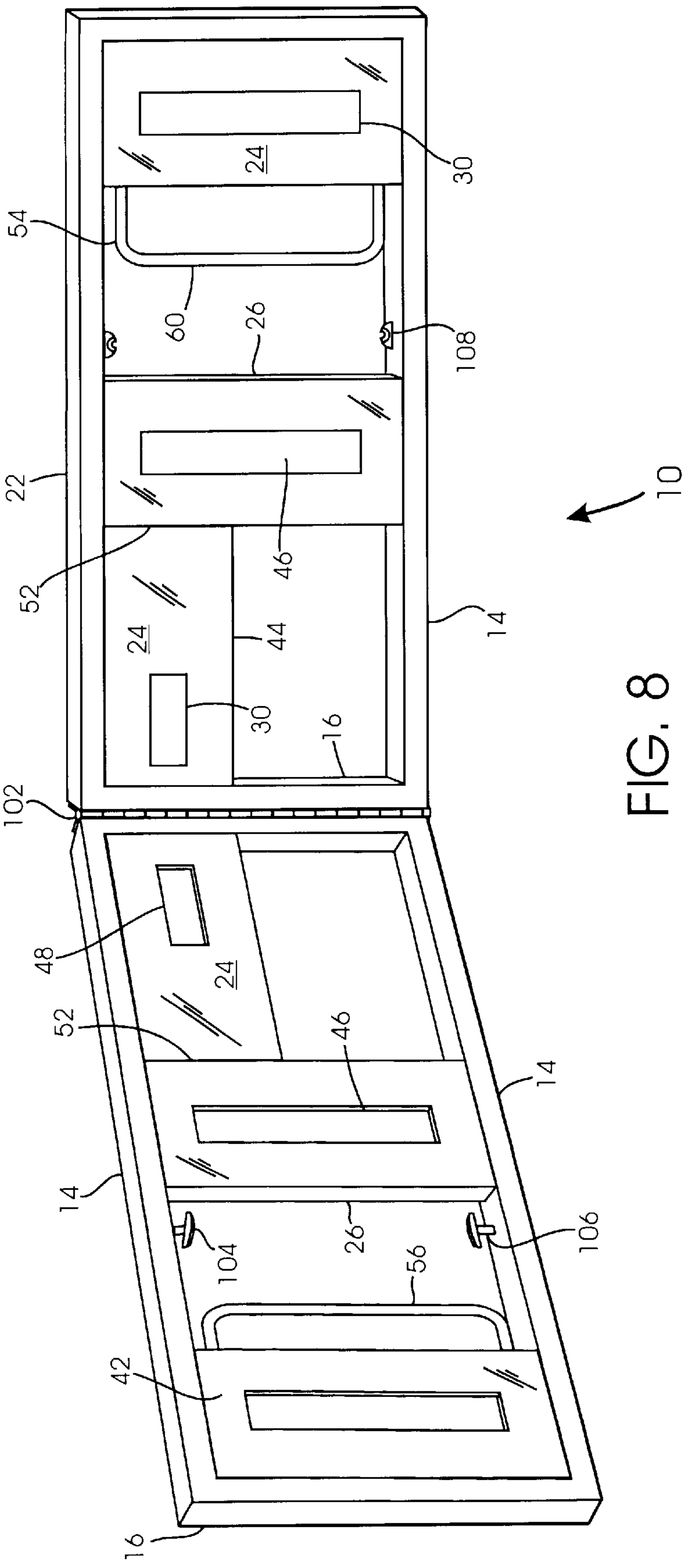
FIG. 8 is a bottom perspective view of the preferred embodiment of the present invention illustrating a pair of marking templates pivotally connected to one another by a piano hinge.
Figure 9:
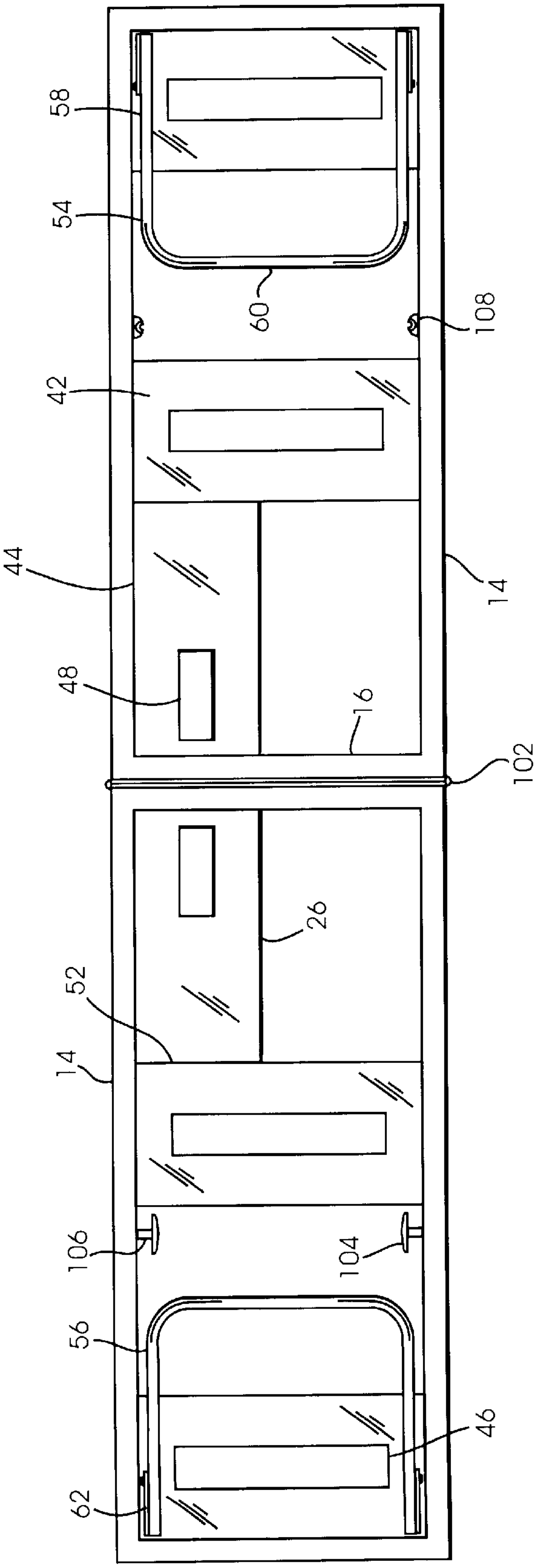
FIG. 9 is a top view of the preferred embodiment of the present invention illustrating a pair of marking templates being placed in an open position and coexisting on the same horizontal plane.

Although the template assembly 10 could conceivably consist of one marking template for purposes of marking field lines 28, it is preferred that it comprise of two marking templates in order to achieve greater alignment possibilities and minimize the time needed to create the requisite number of field lines on the playing surface 20. In such an arrangement, the pair of marking templates 12 is pivotally connected together at and along the end rails of each marking template, as illustrated in FIGS. 8 and 9. Preferably, the means to which the marking templates are allowed to pivot with respect to one another is principally established through use of a piano hinge 102 of the type that can be welded or riveted to the length of the end rails 16. The piano hinge is preferably connected to the end rails in such a manner so as to allow the two marking templates 12 to rigidly coexist on the same horizontal plane without the two marking templates being allowed to collapse inward toward one another as the template assembly 10 is being lifted and moved from location to location.

Figure 10:
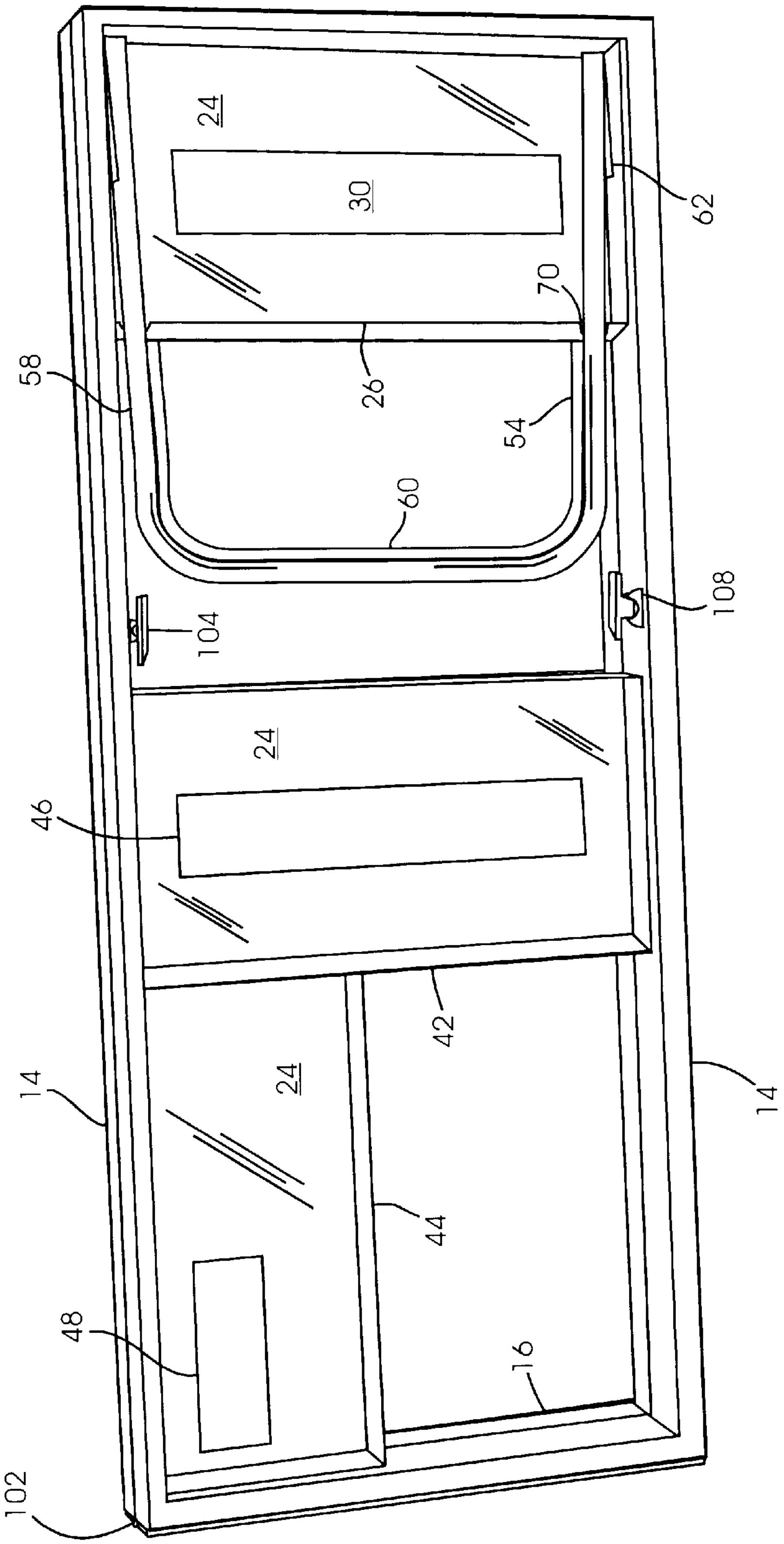
FIG. 10 is a top perspective view of the preferred embodiment of the present invention illustrating a pair of marking templates in a closed, collapsed state.

As depicted in FIGS. 8 and 10, should it be desirable to use two marking templates for creating field lines, the template assembly may comprise of means to effectively lock one marking template with the other for short- and long-term storage and handling during transport. A pair of latches 104 of the type comprising a tensioning member 106 preferably made from rubber is positioned on the two side rails of one of the two marking templates 12, specifically between the two hash line marking pans 42, as shown in FIG. 8. Similar to the positioning of the two latches on the first marking template, the second marking template comprises a pair of receiving hooks 108 fixedly connected to the inner wall 98 of the pair of side rails 14, each being configurably arranged to receive and engage a portion of the latch.

Figure 5:
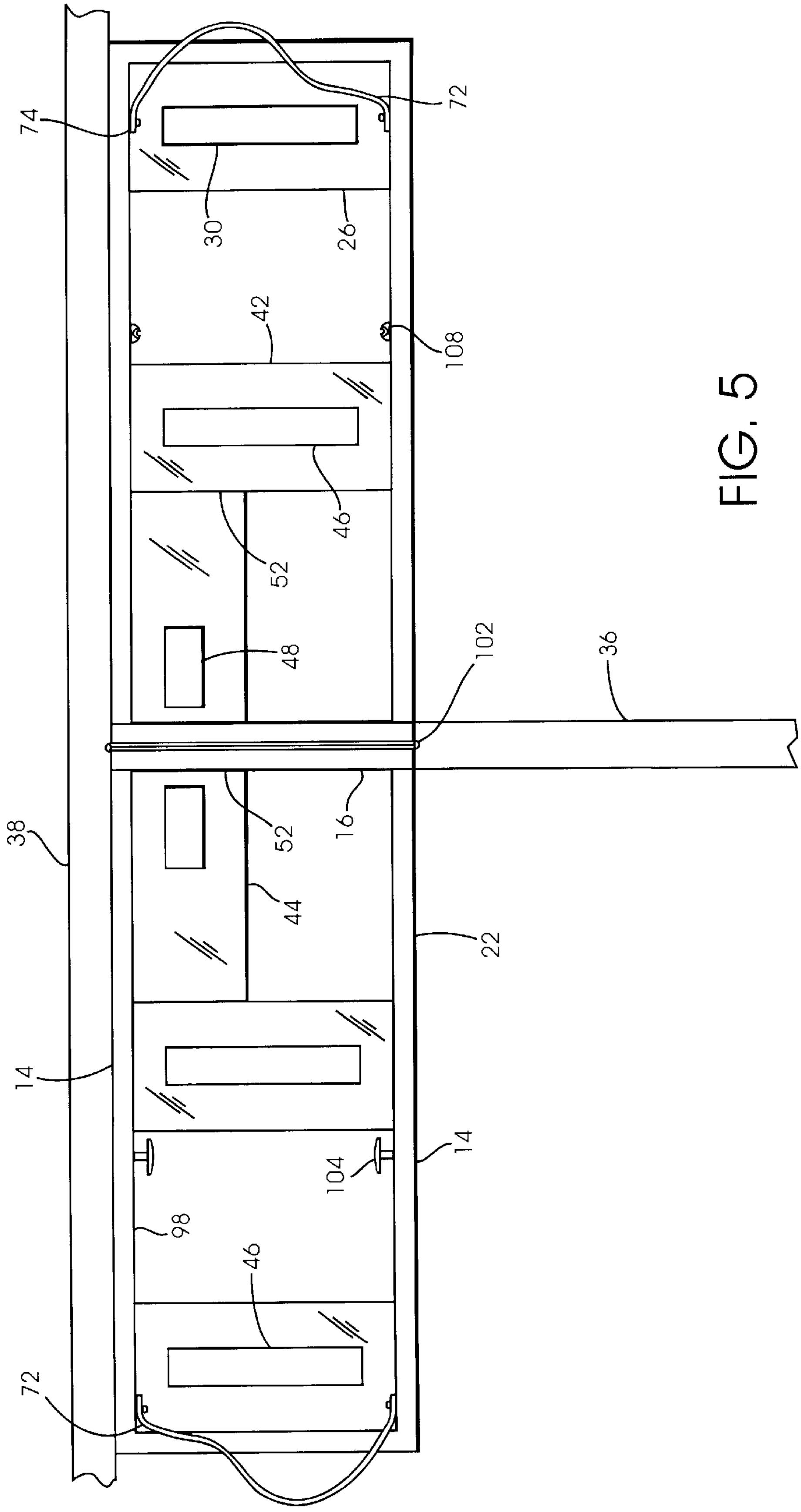
FIG. 5 is a top view of the preferred embodiment of the present invention illustrating a pair of marking templates being positioned atop a yard line and abutting a sideline.

In operation of the preferred embodiment, one of which comprises two marking templates 12 pivotally connected together by the piano hinge 102, the latches 104 are disengaged from their corresponding receiving hooks 108 by outwardly moving the latches until the engaging portion of the latch extends beyond and clears the receiving hook. The marking templates 12 are then outwardly opened insofar that each coexists on the same horizontal plane. Each handle assembly 54 is then movably placed in an upright orientation, specifically until the collapsible support brackets 62 are diagonally extended to cause the lower portion 68 of the vertical supports 58 to be positioned near the end rail 16, as described above. As depicted in FIG. 5, marking of hash lines at the sideline 38 is simply accomplished by placing the entire length of the end-to-end positioned side rails 14 of the two marking templates 12 in abutting relation to an established, pre-marked sideline and centrally placing that portion of the side-by-side ends rails, specifically where the piano hinge 102 is attached at the end rails, over a known reference point, such as the yard line 36 or goal line 110, if commencing the marking of the first set of hash lines. During this procedure, no marking media is placed into the rectangular-shaped inbound line openings 48 of the inbound marking pans 44, but only into the rectangular-shaped hash line openings 46 of the hash line marking pans 42. The template assembly 10 is similarly situated at midfield to create the requisite number and spatial separation of the inbound lines 40, with the exception that marking media is placed into the rectangular-shaped hash line and inbound line openings 46, 48 of both the hash line and inbound marking pans 42, 44. In most instances of its use at midfield, the marking template 12 will be inwardly located and positioned a predetermined distance from the sideline 38, depending on the level of play (i.e., at the professional, college, and high school levels) and aligned lengthwise in parallel relation therewith using a stretched string line or equivalent means for achieving alignment with the sideline.

It can be seen from the foregoing that there is provided in accordance with this invention a simple and easily operated device, which is particularly suitable for creating and marking field lines 28 on a playing surface 20 of the type commonly known in the art and utilized in the game of football. The template assembly 10 is completely functional in terms of creating the requisite number of hash lines 34 needed along the two sidelines 38 and near and at midfield of the playing surface 20 to sufficiently establish the inbound field lines 40. It is obvious that the components comprising the template assembly may be fabricated from a variety of materials, providing such selection or use of materials possess the capacity to remain rigid throughout its duration of use for continued, accurate placement of field lines about the playing surface. It is most desirable, and therefore preferred, to construct the template assembly 10 from a light-weighted material such as aluminum to ensure sustained reliability during use thereof, as hereinbefore stated.

While there has been shown and described a particular embodiment of the invention, it will be obvious to those skilled in the art that various changes and alterations can be made therein without departing from the invention and, therefore, it is aimed in the appended claims to cover all such changes and alterations as fall within the true spirit and scope of the invention.

What is claimed is:

1. A template assembly for use in creating and establishing the requisite number and spatial separation of field lines typically appearing on a football playing surface, said template assembly comprising, in combination:

at least one marking template comprising a pair of side rails and a pair of end rails integrally connected at their ends to substantially form a rectangular-configured frame; and a plurality of marking pans situated within and fixedly attached to said rectangular-configured frame, each having a bottom facing plate and an upwardly extending wall along the perimeter thereof to substantially form a receptacle for holding and collecting marking media used in establishing the field line, said bottom facing plate comprising a rectangular-shaped opening having geometric dimensions substantially equivalent to the width and length of the field line typically appearing on a football playing surface.

2. A template assembly as set forth in claim 1, wherein said marking pans comprises a pair of hash line marking pans and an inbound line marking pan.

3. A template assembly as set forth in claim 2, wherein said inbound line marking pan is positioned perpendicular to said hash line marking pans.

4. A template assembly as set forth in claim 1, further comprising a handle assembly for positioning said marking template about the football playing surface to create field lines.

5. A template assembly as set forth in claim 4, wherein said handle assembly comprises an elongate tubular member substantially configured to form a pair of vertical supports and a horizontal member extending therebetween, perpendicular thereto, to substantially serve as a location to grab said handle assembly.

6. A template assembly as set forth in claim 5, wherein said handle assembly further comprises a pair of collapsible support brackets each having a pair of ends, one end being pivotally attached to a lower portion of said vertical support and a second end being pivotally attached to an end portion of said side rail, collectively serving to permit said handle assembly to collapse inward toward said marking pans for storage of said marking template.

7. A template assembly as set forth in claim 4, wherein said handle assembly comprises a flexible member having a pair of ends each being fixedly attached to an inner wall of said side rail.

8. A template assembly as set forth in claim 1, wherein each marking template further comprises a pair of windblock walls each being pivotally attached lengthwise to said side rails using a piano hinge of equivalent length.

9. A template assembly as set forth in claim 8, wherein each of said windblock walls comprises a retention clip located at an end thereof.

10. A template assembly as set forth in claim 1, wherein said marking template comprises an end panel having an elongate cutout at an upper portion thereof to substantially serve as a location to grab and move said marking template.

11. A template assembly as set forth in claim 1, wherein each of side rails comprises a stabilizing assembly to prevent inadvertent movement of said marking template as marking media is applied to said rectangular-shaped opening of each of said marking pans.

12. A template assembly as set forth in claim 11, wherein said stabilizing assembly comprises an elongate spike moveably positioned within a locking receptacle, said elongate spike having an outwardly extending arm principally serving as means to position and lock said elongate spike within said locking receptacle at and below said side rail.

13. A template assembly as set forth in claim 12, wherein said elongate spike further comprises a pointed end principally serving to ease positioning thereof in the playing surface.

14. A template assembly for use in creating and establishing the requisite number and spatial separation of field lines typically appearing on a football playing surface, said template assembly comprising, in combination:

a pair of marking templates each comprising a pair of side rails and a pair of end rails integrally connected at their ends to substantially form a rectangular-configured frame, said marking templates being pivotally joined together by a piano hinge fixedly attached lengthwise to said end rails of said marking templates;

a pair of hash line marking pans situated within and fixedly attached to each of said rectangular-configured frames of said marking templates, each hash line marking pan having an upwardly extending wall along the perimeter thereof to substantially form a receptacle for holding and collecting marking media used in establishing the field line and a bottom facing plate comprising a rectangular-shaped hash line opening extending therethrough and having geometric dimensions substantially equivalent to the width and length of a hash line typically appearing on the football playing surface;

an inbound line marking pan situated within and fixedly attached to each of said rectangular-configured frames of said marking templates and positioned perpendicular to said hash line marking pans, said inbound line marking pan having an upwardly extending wall along the perimeter thereof to substantially form a receptacle for holding and collecting marking media used in establishing the field line and a bottom facing plate comprising a rectangular-shaped inbound line opening extending therethrough and having geometric dimensions substantially equivalent to the width and length of an inbound line typically appearing on the football playing surface; and a handle assembly comprising an elongate tubular member substantially configured to form a pair of vertical supports and a horizontal member extending therebetween, perpendicular thereto, to principally serve as a location to grab said handle assembly.

15. A template assembly as set forth in claim 14, wherein said handle assembly further comprises a pair of collapsible support brackets each having a pair of ends, one end being pivotally attached to a lower portion of said vertical support and a second end being pivotally attached to an end portion of said side rail, collectively serving to permit said handle assembly to collapse inward toward said marking pans for storage of said marking templates.

16. A template assembly as set forth in claim 14, wherein said upwardly extending wall of said hash line marking pan comprises a pair of notches for receiving and engaging a lower portion of said vertical supports, each of said notches having a depth and width approximately one and one-half the diameter of said vertical support.

17. A template assembly as set forth in claim 14, wherein said side rails of one marking template comprises a pair of latches each having a tensioning member and said side rails of the second marking template comprising a pair of receiving hooks for engaging a portion of said latch.

18. A template assembly as set forth in claim 14, wherein each of side rails comprises a stabilizing assembly to prevent inadvertent movement of said marking template as marking media is applied to said rectangular-shaped inbound line and hash line openings of said marking templates.

19. A method for creating and establishing the requisite number and spatial separation of field lines typically appearing on a football playing surface, said template assembly comprising, in combination:

providing a pair of marking templates each comprising a pair of side rails and a pair of end rails integrally connected at their ends to substantially form a rectangular-configured frame;

attaching a pair of hash line marking pans to each of said rectangular-configured frames of said marking templates, each hash line marking pan having an upwardly extending wall along the perimeter thereof to substantially form a receptacle for holding and collecting marking media used in establishing the field line and a bottom facing plate comprising a rectangular-shaped hash line opening extending therethrough and having geometric dimensions substantially equivalent to the width and length of a hash line typically appearing on the football playing surface;

attaching an inbound line marking pan to each of said rectangular-configured frames of said marking templates with said inbound line marking pan being positioned perpendicular to said hash line marking pans, said inbound line marking pan having an upwardly extending wall along the perimeter thereof to substantially form a receptacle for holding and collecting marking media used in establishing the field line and a bottom facing plate comprising a rectangular-shaped inbound line opening extending therethrough and having geometric dimensions substantially equivalent to the width and length of an inbound line typically appearing on the football playing surface;

attaching a handle assembly to each of said marking templates and joining together said marking templates at said end rails using a piano hinge;

lifting said marking templates at said handle assemblies and positioning said marking templates lengthwise alongside a known reference and centering said piano hinge over a known reference; and applying marking media to said rectangular-shaped hash line and inbound line openings for creation of field lines.

20. A method as set forth in claim 19, wherein said handle assembly comprises an elongate tubular member substantially configured to form a pair of vertical supports and a horizontal member extending therebetween, perpendicular thereto, to principally serve as a location to grab said handle assembly.

* * * * *